United States Patent [19]

Hotate et al.

[11] Patent Number: 4,682,044
[45] Date of Patent: Jul. 21, 1987

[54] ENGINE IDLING LOAD CONTROL MEANS

[75] Inventors: Makoto Hotate; Tadashi Kaneko; Toshio Nishikawa, all of Hiroshima; Tadataka Nakazumi, Kure; Nobuo Takeuchi, Hiroshima, all of Japan

[73] Assignee: Mazda Motor Corporation, Hiroshima, Japan

[21] Appl. No.: 791,447

[22] Filed: Oct. 25, 1985

[30] Foreign Application Priority Data

Oct. 25, 1984 [JP] Japan .................. 59-225378
Oct. 25, 1984 [JP] Japan .................. 59-225379

[51] Int. Cl.[4] .............................................. H02J 7/00
[52] U.S. Cl. ................... 290/40B; 290/40C; 322/28; 307/10 R
[58] Field of Search ............. 290/40 R, 40 A, 40 B, 290/40 C, 14, 17, 19, 20, 21, 24, 25, 34; 123/339; 322/17, 18, 28, 29, 38, 27; 307/8, 10 R, 76, 78, 84, 85, 87

[56] References Cited

U.S. PATENT DOCUMENTS 3,991,357 11/1976 Kaminski ................ 290/37 R X
4,117,344 9/1978 Boerstler et al. ............ 290/40 C X
4,322,630 3/1982 Mezera et al. .................... 290/40 C
4,330,743 5/1982 Glennon ....................... 290/38 R X
4,417,194 11/1983 Curtiss et al. ................. 290/40 B X
4,543,521 9/1985 Morishita et al. ................ 322/28 X
4,553,516 11/1985 Hasegawa ............................ 123/339

FOREIGN PATENT DOCUMENTS

54-98413 8/1979 Japan .

Primary Examiner—William M. Shoop, Jr.
Assistant Examiner—Shik Luen Paul Ip
Attorney, Agent, or Firm—Fleit, Jacobson, Cohn & Price

[57] ABSTRACT

An automobile engine having a device for increasing the inkage air in idle operation when a load is applied to the engine from equipments associate with the engine. An alternator driven by the engine has a voltage regulator which controls the alternator output in response to a load condition on the alternator by controlling the field current. A control unit is provided to restrict an increase in the field current when an electric load is turned on for a time period required for having the engine output increased.

9 Claims, 8 Drawing Figures

ENGINE IDLING LOAD CONTROL MEANS

BACKGROUND OF THE INVENTION

1. Field of the Invention

The present invention relates to engine load control means and more particularly to means for controlling engine load so that a decrease in the engine speed can be avoided when an electrical load is applied to the engine. More specifically, the present invention pertains to means for controlling load on an engine having an electric generator.

2. Descriptions of Prior Art

In vehicle engines, problems have been experienced in that the engine speed is abruptly decreased when a load is applied to an idling engine by for example turning an air conditioner on or moving the shift lever of an automatic transmission to a driving range. Such a decrease in the engine speed causes an engine stop or rough engine operation. In order to avoid such problems, it has been proposed to change the engine operating conditions by for example increasing intake air flow and/or fuel supply.

For example, in Japanese patent application No. 53-5362 filed on Jan. 20, 1978 and disclosed for public inspection on Aug. 3, 1979 under the disclosure number 54-98413, there is disclosed an engine control system which includes an air passage bypassing the throttle valve. A control valve is provided in the air passage for opening the passage when a load is applied to the engine so that an additional air supply is made through the air passage.

It should however be noted that the conventional system is not satisfactory since there will be delays in the operations of the control valve and the engine. As soon as the load is applied to the engine, a signal may be produced for operating the control valve, however, there is a mechanical delay in the operation of the control valve. There is also a certain time delay before the engine speed can increase after the additional air supply is actually started. Thus, the engine operation cannot rapidly follow the increase in the load and there may still be a risk that the engine speed is decreased to an unacceptable value. It may therefore be a way to delay the start of operation of the load until the engine speed is sufficiently increased. However, the solution is dissatisfactory because it is always not preferable to delay the operation of the load. Further, in case of shift levers for automatic transmissions, it is impossible to delay the load of the transmission incurred on the engine after the shift lever is moved to a driving range.

SUMMARY OF THE INVENTION

It is therefore an object of the present invention to provide means for controlling a load on an engine having an electric generator, which can prevent a decrease in the engine speed when the engine is subjected to an additional load.

Another object of the present invention is to provide means for controlling a load on an engine to avoid an abrupt decrease in the engine speed when the engine is subjected to an additional load without necessitating a delay in starting operation of an equipment which causes such additional load.

A further object of the present invention is to provide means for controlling the output of an electric generator driven by an engine when the engine is subjected to an additional load so that an abrupt decrease in the engine speed can be avoided.

According to the present invention, the above and other objects can be accomplished by a power plant including an engine, electric generator means driven by said engine to produce an electric output which is adapted to be supplied to an electric load, electric cell means connected with said load such that an electric power is supplied from said generator means to said load when the generator means provides a voltage higher than a voltage of the cell means but from said cell means when the voltage of said generator means is lower than the voltage of the cell means, load detecting means for detecting an instance wherein the electric load is turned on, engine idle output control means for increasing engine idle output when said engine is subjected to said electric load, generator output regulating means for regulating the output of said generator means, generator control means responsive to a signal from said load detecting means showing that the electric load has just been turned on for controlling said generator output regulating means to suppress an increase of the output of the electric generator means for a predetermined time so as to prevent an abrupt decrease in speed of the engine.

According to the features of the present invention, when an electric load is applied to the generator means driven by the engine while the engine is idling, the engine idle ouput control means is started to operate so as to provide an adequate output for driving the load. Although there is a time delay before the engine output is increased, a possible decrease in the engine speed can be avoided since the increase in the output of the generator means is suppressed for a predetermined time. During this time period, the electric power is supplied to the load from the cell means so that the operation of the load can be started immediately.

The above and other objects and features of the present invention will become apparent from the following descriptions of preferred embodiments taking reference to the accompanying drawings.

DESCRIPTION OF THE PREFERRED EMBODIMENTS

Figure 1:
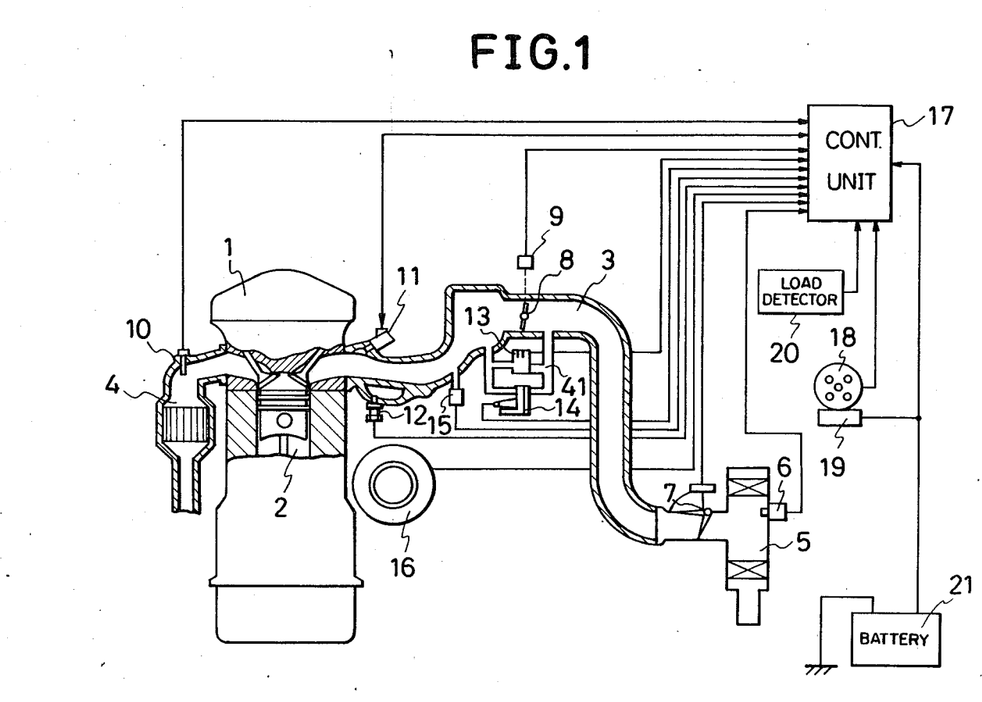
FIG. 1 is a schematic sectional view of an engine having a load control system in accordance with one embodiment of the present invention.

Referring to the drawings, particularly to FIG. 1, there is shown an engine 1 including a cylinder 2, an intake passage 3 and an exhaust passage 4. The intake passage 3 is provided at the upstream end with an air cleaner 5 and an air temperature detector 6 is located in the air cleaner 5. The intake passage 3 is further provided with an airflowmeter 7 and a throttle valve 8 which are arranged in this order from the upstream side. There is a throttle valve position detector 9 which detects the position of the throttle valve 8. The exhaust passage 4 is provided with an $O_2$ sensor 10 for detecting the $O_2$ content in the exhaust gas.

In the vicinity of the intake port, the intake passage 3 has a fuel injection valve 11 for providing a supply of fuel to the engine 1. An engine cooling medium temperature detector 12 is provided in the cooling medium jacket.

The intake passage 3 is formed with a first bypass passage 41 and a second bypass passage 41a which connect upstream and downstream sides of the throttle valve 8. In the first bypass passage 41, there is an intake flow control solenoid valve 13. The second bypass passage 41a is provided with a fast idle up valve 14. The intake passage 3 is further provided with an intake pressure detector 15 which is located downstream the throttle valve 8. An alternator 16 is mounted on the engine 1 so as to be driven by the engine 1.

The outputs of the detectors 6, 7, 9, 10, 12 and 15 are connected with a control circuit 17 which produces outputs for controlling the fuel injection valve 11 and the bypass passage control valves 13 and 14. The engine 1 also has a distributor 18 and an ignitor 19 for controlling ignition of the engine. For detecting that an electric load such as a head lamp is turned on, a load detector 20 is provided. A battery 21 is connected with the control circuit 17. In the illustrated embodiment, the distributor 18 is arranged to provide a signal representing the engine speed and the signal from the distributor is applied to the control circuit 17.

In operation, the control circuit 17 judges the engine operating condition based on the throttle position signal from the detector 9 and the engine speed signal from the distributor 18. When it is judged that the engine 1 is idling, a signal is applied from the control circuit 17 to the valve 13 in the first bypass passage 41 to control the idle air flow. At the same time, the fuel injection valve 11 is actuated to provide a fuel supply for the idling operation.

The fuel injection valve 11 and the solenoid valve 13 are controlled in accordance with various load conditions of the engine so that the fuel supply and the air flow are increased to prevent a decrease in the engine speed due to an increase in the load on the engine 1. Examples of loads on an idling engine are mechanical loads such as a compressor for an air condition and a torque converter of an automatic transmission, and electrical loads such as head lamps and window actuating motors. In the engine which is being described, the solenoid valve 13 is actuated to recover the engine speed whenever the engine speed is decreased due to one or more of such mechanical and electrical loads. The fast idle up valve 14 is opened when the engine cooling medium temperature is below a predetermined value to increase the engine speed.

Figure 2:
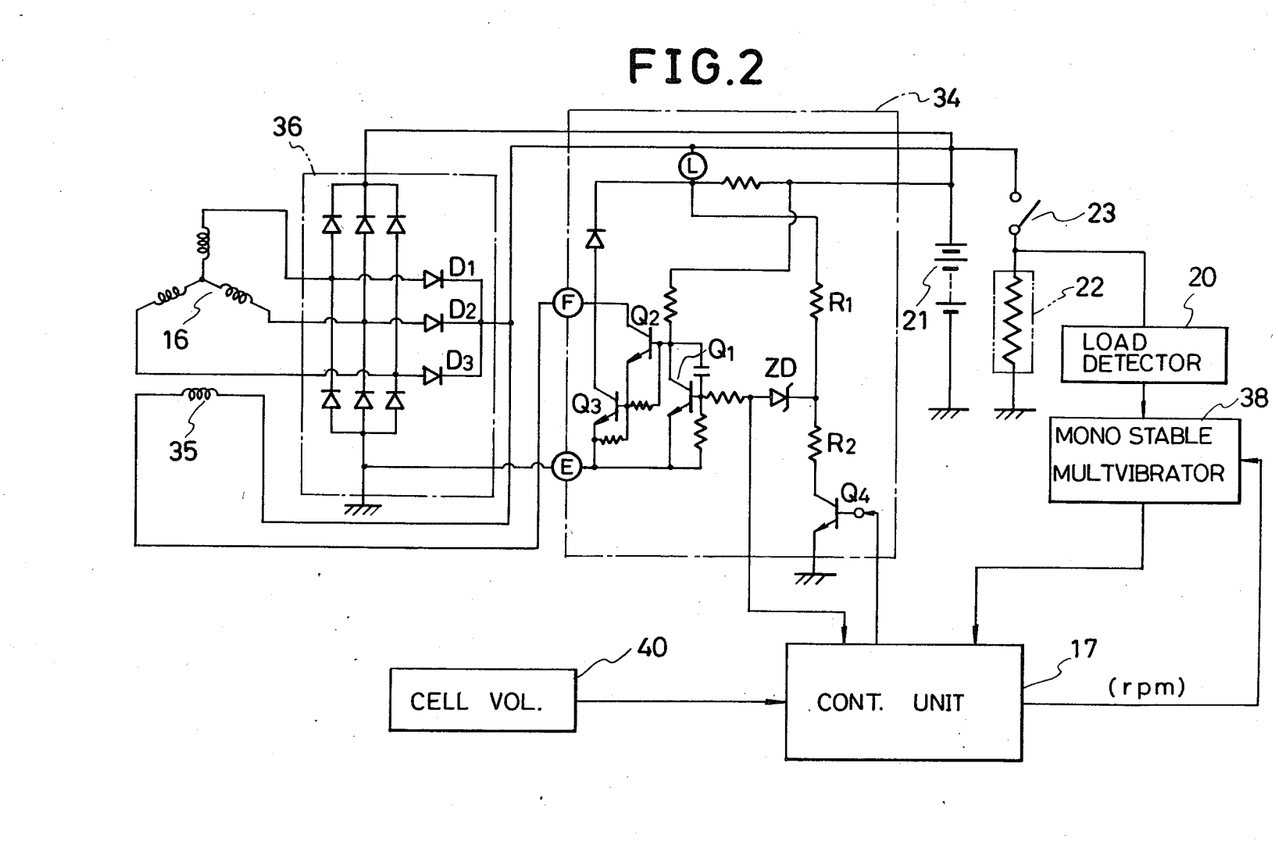
FIG. 2 is a electric circuit diagram showing the load control system.

Referring now to FIG. 2, there is shown a part of the control circuit together with the alternator voltage regulating circuit. The alternator 16 is of a three phase type having rotor coils of a star connection and a field coil 35. The rotor coils of the alternator 16 is connected with a rectifier circuit 36 having diodes $D_1$, $D_2$ and $D_3$. The rectifier circuit 36 has an output connected to one end of the field coil 35.

There is provided a voltage regulating circuit 34 having input terminals L and F. The output of the rectifier circuit 36 is connected with the input terminal L. The field coil 35 is connected at the other end with the input terminal F. The circuit 34 includes a first transistor $Q_1$ having a collector connected with the terminal L. The emitter of the transistor $Q_1$ is grounded and the base is connected with one end of a zenor diode ZD which is connected at the other end with a voltage divider comprising resistors $R_1$ and $R_2$.

The circuit 34 further includes a second transistor $Q_2$ having a base connected with the collector of the transistor $Q_1$. The second transistor $Q_2$ also has a collector connected with the terminal F and an emitter connected with a base of a third transistor $Q_3$. The third transistor $Q_3$ has a collector connected with the terminal F and an emitter which is grounded. The bases of the transistors are grounded through appropriate resistors. The resistor $R_2$ of the voltage divider is connected to the ground through a fourth transistor $Q_4$ and the resistor $R_1$ is connected with the terminal L and a main electric cell 21. The base of the transistor $Q_4$ is connected with an output of the control unit 17 so that the transistor $Q_4$ is turned on to the ground the resistor $R_2$ when a high level signal is applied to the base.

In the circuit as described, when the transistor $Q_4$ is not turned on, the current does not flow through the resistor $R_1$ and $R_2$ of the voltage divider to make the zener diode ZD non-conductive so that the first transistor $Q_1$ is made non-conductive and the second and third transistors $Q_2$ and $Q_3$ are made conductive. Thus, the fielded current through the field coil 35 is allowed to flow through the terminal F and the transistors $Q_2$ and $Q_3$. In this situation, the field current increases as the speed of rotation of the rotor coil increases resulting in an increase in the output voltage of the alternator 16. When the transistor $Q_4$ is turned on, current flows from the terminal L to the resistors $R_1$ and $R_2$ so that the first transistor $Q_1$ is turned on. The transistors $Q_2$ and $Q_3$ are therefore turned off and the field current through the field coil 35 is blocked.

Figure 4:
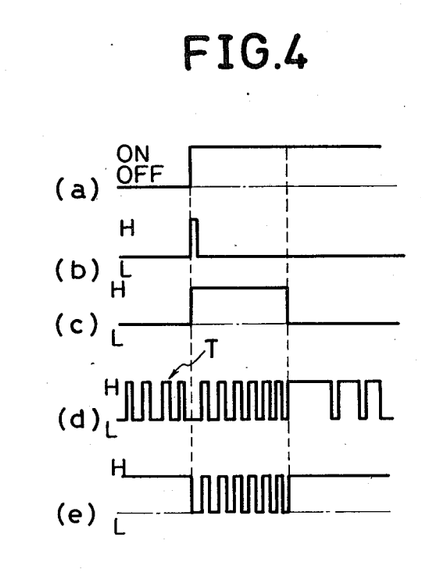
FIG. 4 is a diagram showing signals in the circuits.

In the circuit shown in FIG. 2, the terminal L of the voltage regulating circuit 34 is connected through a switch 23 with an electric load 22. The previously mentioned load detector 20 is connected with the line to the load 22. The load detector 20 may be a differential circuit and produces a pulse signal as shown in FIG. 4(b) when the switch 23 is turned on and the current through the load 22 is produced as shown in FIG. 4(a). The output of the load detector 20 is connected with a mono-stable multivibrator 38 which also receives a signal from the control unit 17 and produces an output which is applied to the control unit 17. In these embodiments the control unit 17 is constituted by a microprocessor.

A cell voltage detector 40 is provided to detect the voltage of the electric cell 21 and produces a cell voltage signal which is applied to the control unit 17. The signal applied from the control unit 17 to the multivibrator 38 is the field current control signal which determines the time constant of the multivibrator 38 so that the duration of a signal pulse from the multivibrator 38 is controlled in accordance with the signal from the control unit 17. The field current control signal corresponds to the engine speed so that the duration of the output pulse of the multivibrator 38 is decreased as the engine speed increases. The signal from the load detector 20 functions to trigger the multivibrator 38 so that the multivibrator 38 produces an output as shown in FIG. 4(c). The control unit 17 produces an output as shown in FIG. 4(e). When the load switch 23 is opened, it produces a continuous high level output so that the transistor $Q_4$ is maintained in the conductive state. Under this situation, the voltage regulating circuit 34 functions to cyclically turn off the field current as shown in FIG. 4(d). The base current of the first transistor $Q_1$ is applied to the control unit so that the field current is detected from the base current of the transistor $Q_1$.

Figure 3:
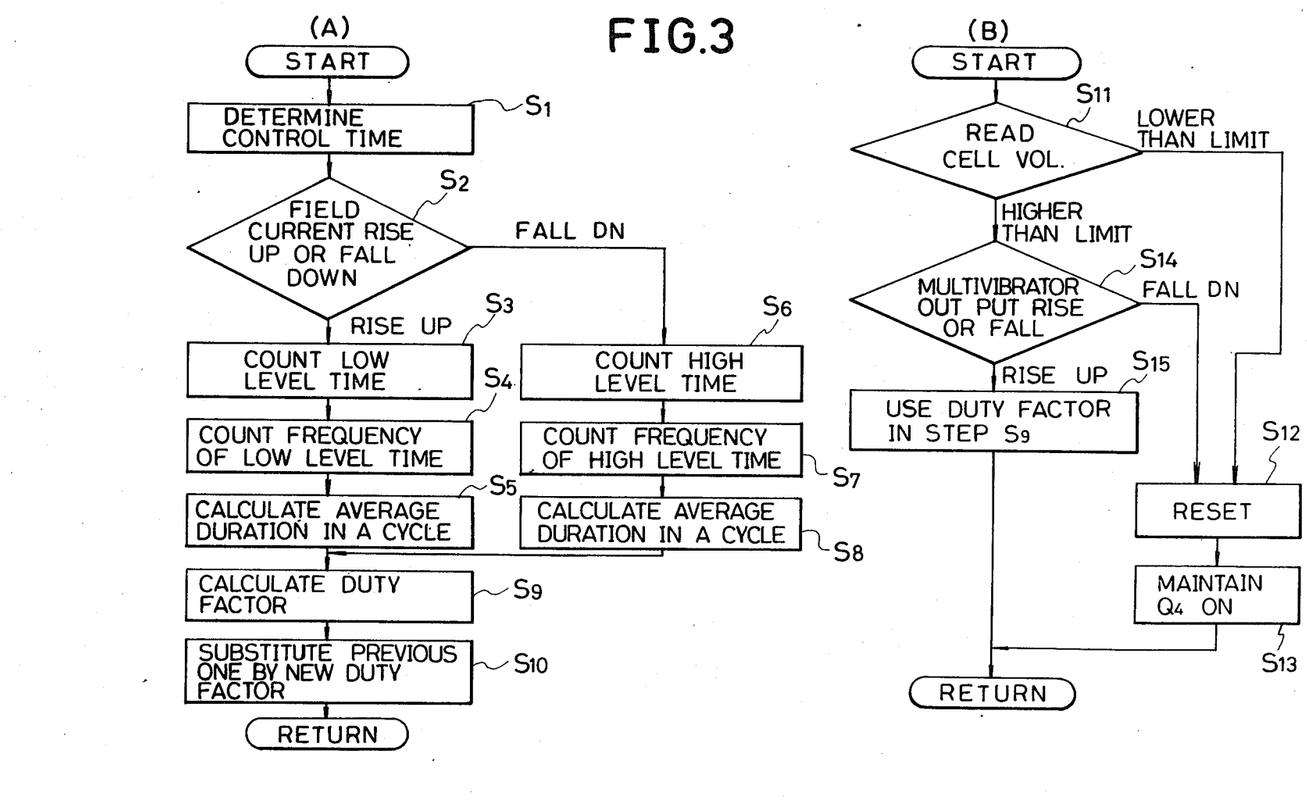
FIG. 3 is program flow charts showing operations of the control unit.

Each time when the field current rises up, a control routine shown in FIG. 3(A) is started. In this routine, a control time period is at first determined in step $S_1$. The control time period corresponds to a time required for the increase in the engine output after the load switch 23 is turned on. Thereafter, a judgement is made in step $S_2$ as to whether the current to the zenor diode ZD has been raised up or fallen down. In case where there is a rising up in the zenor diode current, a low level time is counted in step $S_3$ for a predetermined time period up to the instance when the load switch 23 is turned on. Then, the frequency of the low level time is counted in step 4 for the aforementioned predetermined time period. Thereafter, a calculation is carried out in step $S_5$ to obtain an average value of the low level time for each cycle from the results of the counts in the steps $S_3$ and $S_4$. In a similar manner, a high level time for each cycle is calculated in steps $S_6$, $S_7$ and $S_8$ when it is judged that there is a fall down in the zenor diode current. Based on the low level time and the high level time thus calculated, a duty factor is calculated in step $S_9$ and the previous duty factor is substituted by the newly obtained duty factor.

When the load switch 23 is turned on, the control unit 17 produces an output which energizes the solenoid valve 13 to open the same. Therefore, the intake air to the engine is increased. At the same time, the cell voltage is read in step $S_{11}$ and when the cell voltage in lower than an allowable lower limit, a step $S_{12}$ is carried out to reset the duty factor calculation in the previous steps and the control unit 17 produces a continuous high level output in step $S_{13}$ to maintain the transistor $Q_4$ in the conductive state. Then, the duration of the field current is immediately increased to increase the output of the alternator 16.

When the cell voltage is above the lower limit, an interrrupting routine is carried out by the output pulse of the multivibrator 38. Thus, in step $S_{14}$, a judgement is made as to whether the output from the multivibrator is raised up or fallen down. When the output is raised up, a step $S_{15}$ is carried out to produce output pulses corresponding to the duty factor obtained in the step $S_9$. Thus, the field current is maintained as in the condition before the load 22 is turned on. When it is judged in step $S_{14}$ that the output pulse from the multivibrator 38 fell down, the steps $S_{12}$ and $S_{13}$ are carried out so that the field current is increased as shown in FIG. 4(d).

Figure 5:
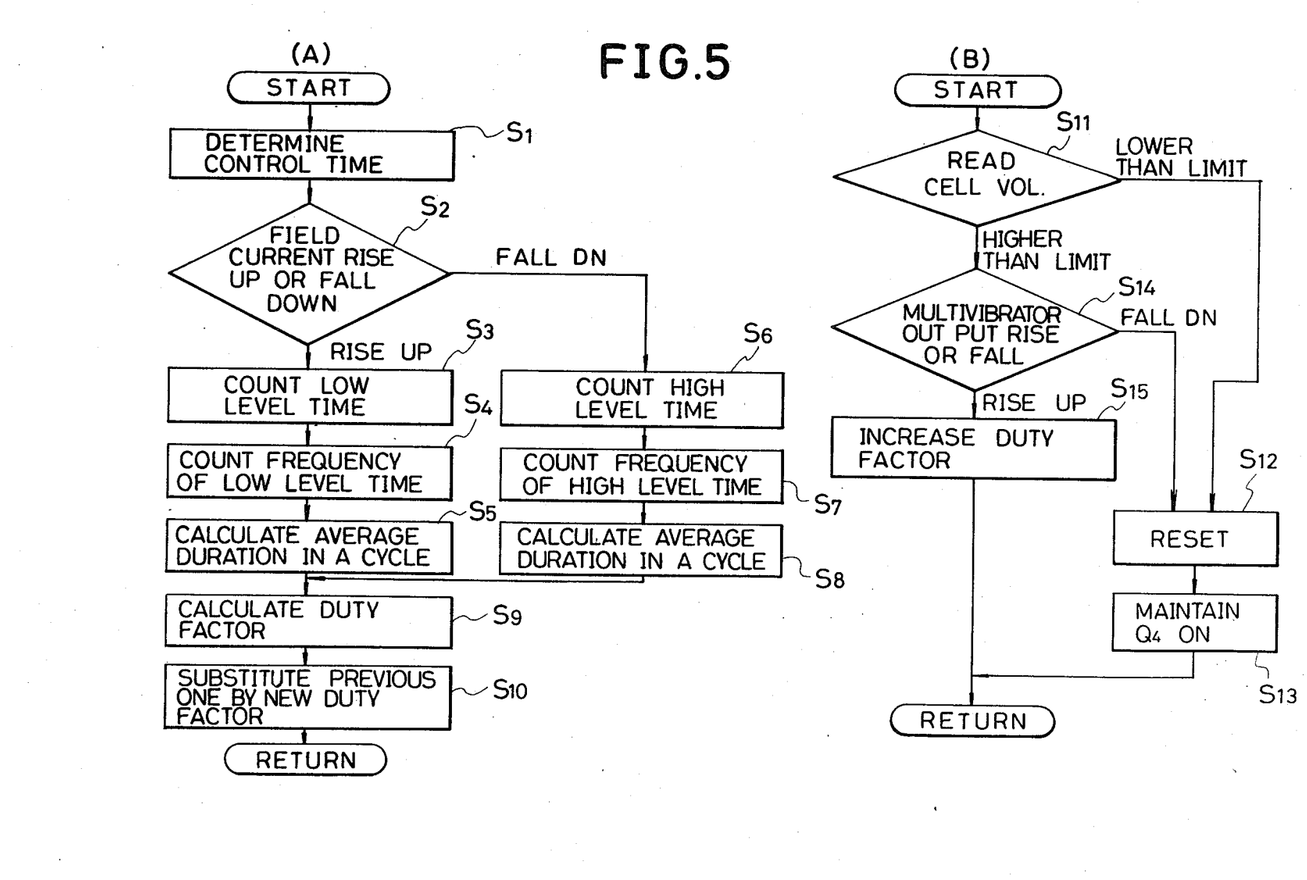
FIG. 5 shows program flow charts for the operation of the control unit in accordance with another embodiment of the present invention.
Figure 6:
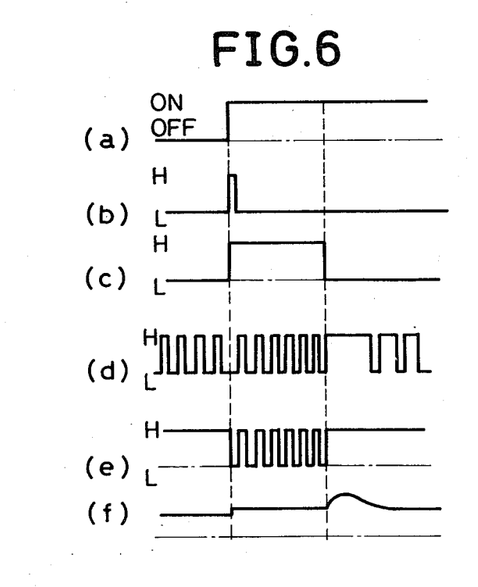
FIG. 6 is a diagram showing the signals in the circuit shown in the embodiment of FIG. 5.

Referring to FIGS. 5 and 6, the control steps in this embodiment are substantially the same as in the previous embodiment but the step $S_{15}$ is slightly modified. In the step $S_{15}$ of this embodiments, the duty factor as obtained in step $S_9$ is modified in accordance with the engine speed so that the duty factor is increased as compared with that obtained in the step $S_9$, the amount of increase being increased in accordance with an increase in the engine speed. Therefore the output of the alternator is slightly increased in the control period than in the period wherein the load 22 is not turned on.

Figure 7:
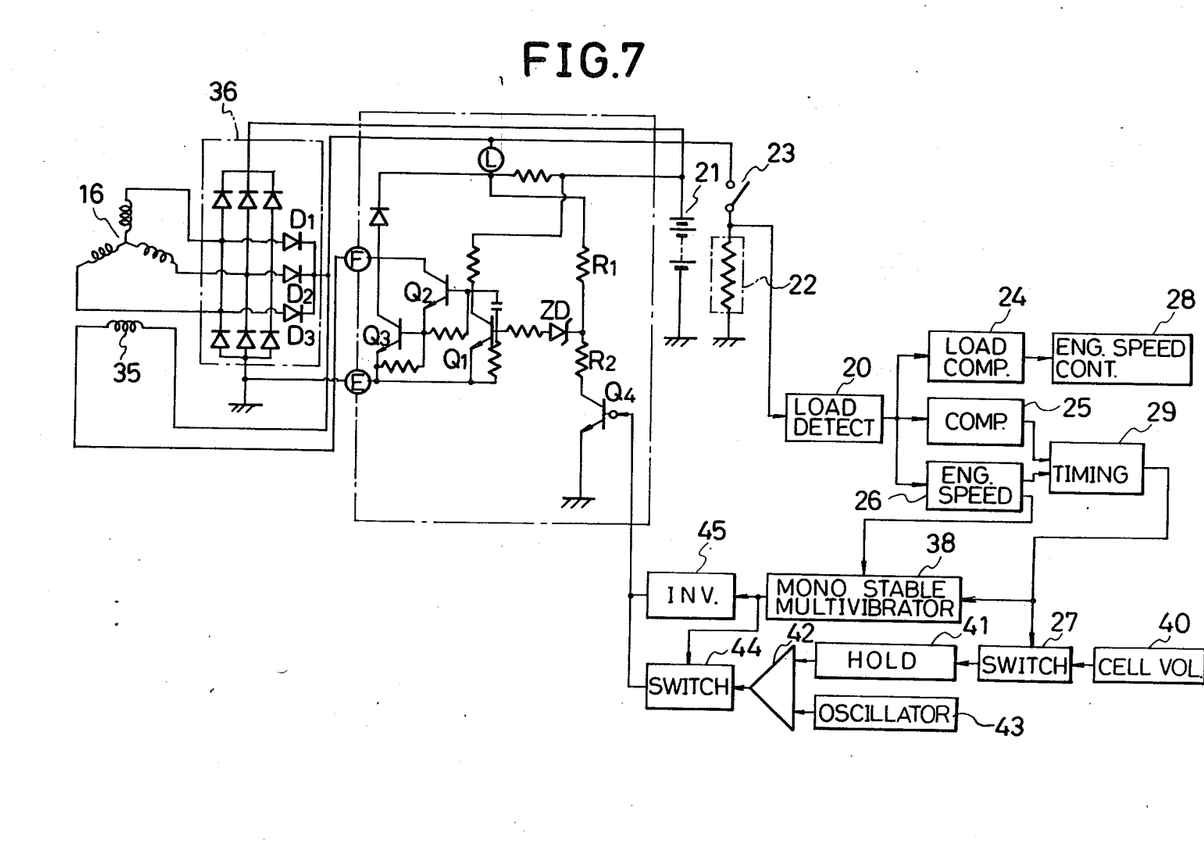
FIG. 7 is a circuit diagram showing a further embodiment.

Referring to FIG. 7, in the embodiment shown therein, the output of the load detector 20 is connected with a load compensating circuit 24, a cell voltage comparator 25 and an engine speed discriminating circuit 26.

The load compensating circuit 24 receives the signal pulse from the load detector 20 and produces a high level output signal which is applied to an engine speed control circuit 28 which produces an output for actuating the solenoid valve 13 in accordance with the signal from the circuit 24. Thus, the engine speed is increased.

The cell voltage comparator 25 is triggered to operate by the signal pulse from the load detector 25. It functions to compare the actual cell voltage under the electric load 22 with a reference value which represents the allowable lower limit of the cell voltage and produce a high level output when the actual voltage is higher than the reference value and a low level output when the actual voltage is lower than the reference value.

The engine speed discriminating circuit 26 is also triggered to operate when the signal pulse is applied thereto from the load detector 20. It functions to detect the actual engine speed and judge as to whether the engine speed is satisfactorily maintained under the electric load 22 due to the function of the load compensating circuit 24. When the engine speed is lower than a satisfactory level, the circuit 26 produces a high level output.

The outputs of the circuits 25 and 26 are connected with a timing circuit 29 which has a function of an AND circuit. The timing circuit 29 produces a high level output when both the circuits 25 and 26 produce high level outputs. The output of the timing circuit 29 is applied to a switching circuit 27 to turn on the same. The switching circuit 27 connects a cell voltage detecting circuit 40 with a hold circuit 41 so that the cell voltage signal is passed to the hold circuit 41 when the switching circuit 27 is turned on. The output of the hold circuit 41 is applied to a comparator 42 which is also connected with the output of an oscillator 43. The oscillator 43 produces saw-teeth outputs which are compared by the comparator 42 with the cell voltage signal from the hold circuit 41. The comparator 42 produces a high level output when the cell voltage signal is greater than the signal from the oscillator 43. The output of the comparator 42 is applied through a switching circuit 44 to the base of the transistor $Q_4$.

The output of the timing circuit 29 is also connected with a monostable multivibrator 38. The multivibrator 38 is also connected with the engine speed discriminating circuit 26 to receive an engine speed signal. The engine speed signal from the circuit 26 determines the time constant of the multivibrator 38 so that the duration of the output pulse from the multivibrator 38 is decreased in response to an increase in the engine speed. The multivibrator 38 is triggered to produce an output which is applied to the switching circuit 44 to turn on the same. The output of the multivibrator 38 is also connected through an inverter 45 with the base of the transistor $Q_4$.

In operation, when the load switch 23 is turned on, a pulse is produces by the load detecting circuit 20. It will be understood from the previous descriptions that, when the cell voltage is sufficiently high and the engine speed is low, the timing circuit 29 produces a high level output. Thus, the switching circuit 27 is turned on and the cell voltage signal is passage from the detector 40 to the hold circuit 41 which holds the cell voltage signal. The comparator 42 produces output pulses having durations corresponding to the cell voltage.

At the same time, the output of the timing circuit 29 triggers the multivibrator 38 which then produces a high level output of a predetermined duration. Thus, the output of the inverter 45 turns to low level and the switching circuit 44 is closed to pass the output of the comparator 42 to the base of the transistor $Q_4$. It will therefore be understood that the field current is controlled by the output pulses of the comparator 42. It is therefore possible to suppress the increase of the field current of the alternator 16.

Figure 8:
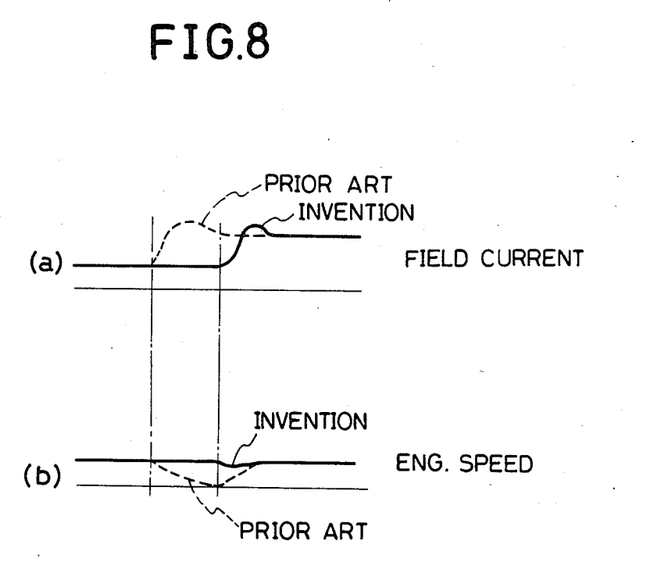
FIG. 8 is a diagram showing signals in the circuit of FIG. 7.

When the predetermined time passes, the output of the multivibrator 38 turns to low level so that the inverter 45 produces a high level output. Thus, the transistor $Q_4$ is maintained in the conductive state and the field current is controlled in accordance with load conditions as in conventional ways. It is therefore possible to control the field current as shown in FIG. 8(a) so that the engine speed can be maintained as shown in FIG. 8(b).

The invention has thus been shown and described with reference to specific embodiments, however, it should be noted that the invention is in no way limited to the details of the illustrated embodiment but changed and modifications may be made without departing from the appended claims.

We claim:

1. A power plant including an engine, electric generator means driven by said engine to produce an electric output which is adapted to be supplied to an electric load, electric cell means connected with said load such that an electric power is supplied from said generator means to said electric load when the generator means provides an output voltage higher than a voltage of the electric cell means but from said electric cell means when the voltage of said generator means is lower than the voltage of the electric cell means, load detecting means for detecting an instance wherein the electric load is turned on, engine control means for increasing engine output when said engine is being operated in an idling condition and subjected to said electric load, generator output regulating means for regulating the electric output voltage of said generator means in accordance with an electric current to said electric load so that a field current of said generator means is increased as the electric output voltage of the generator means increases, generator control means responsive to a signal from said load detecting means showing that the electric load has just been turned on for controlling said generator electric output voltage regulating means to suppress an increase of the field current and thereby suppress an increase of the electric output voltage of the electric generator means for a predetermined time so as to prevent an abrupt decrease in speed of the engine.

2. A power plant in accordance with claim 1 in which said generator means includes an alternator which produces AC output and a rectifying circuit connected with said alternator for rectifying said output of the alternator.

3. A power plant in accordance with claim 1 in which said generator output regulating means includes switching means for controlling field current of the generator means so that the field current is increased in response to an increase in load on the generator means, said generator control means being connected with said switching means for intermittently interrupting the field current to suppress the increase of the output of the generator means.

4. A power plant in accordance with claim 1 in which said generator control means includes a microprocessor which is programmed to maintain field current of the generator means for said predetermined time to a level which is substantially the same as the level before the electric load is turned on.

5. A power plant in accordance with claim 1 in which said generator control means includes a microprocessor which is programmed to increase field current of the generator means for said predetermined time by a predetermined small value greater than a level before the electric load is turned on.

6. A power plant in accordance with claim 1 in which said generator control means includes a monostable multivibrator for determining said predetermined time.

7. A power plant in accordance with claim 6 in which said multivibrator is responsive to engine speed so that the predetermined time is decreased in response to an increase in the engine speed.

8. A power plant in accordance with claim 3 in which said generator control means includes means for providing pulses of predetermined durations and means for passing the pulses to said switching means in said predetermined time to intermittently interrupt the field current.

9. A power plant in accordance with claim 1 which further includes means for detecting voltage of said cell means and prohibiting operation of said generator control means when the voltage of said cell means is below a predetermined value.

* * * * *